(No Model.)
J. BUCHANAN.
THRASHING MACHINE.
No. 297,562. Patented Apr. 29, 1884.
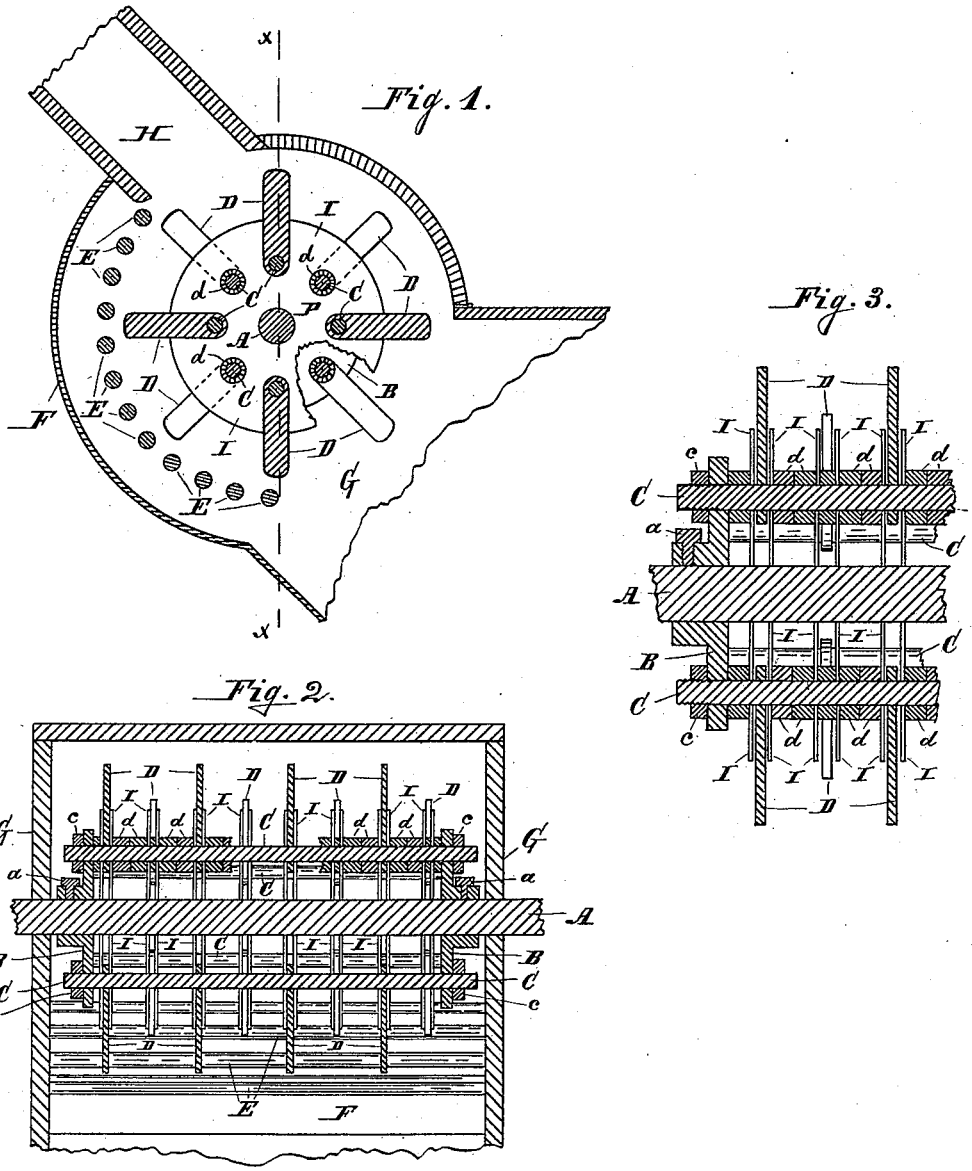

UNITED STATES PATENT OFFICE.

JAMES BUCHANAN, OF INDIANAPOLIS, INDIANA.

THRASHING-MACHINE.

SPECIFICATION forming part of Letters Patent No. 297,562, dated April 29, 1884.

Application filed October 25, 1883. (No model.)

*To all whom it may concern:*

Be it known that I, JAMES BUCHANAN, a citizen of the United States, residing at Indianapolis, in the county of Marion and State of Indiana, have invented a certain new and useful Thrashing-Machine, of which the following is a specification.

The objects of my improvements are to produce a strong and simple device for beating and separating the grain from the straw—one which does not tear and break the straw, and one that in case of breakage can be repaired easily and without loss of time. I attain these objects by the mechanism illustrated in the accompanying drawings, in which—

Figure 1 is a longitudinal vertical section through my beating device; Fig. 2, a vertical cross-section through the same; and Fig. 3, the same section as Fig. 2, but on a larger scale. In Fig. 2 the washers $d\ d$ on shafts C C are only partly shown in order to simplify the view.

The same letters refer to the same or corresponding parts throughout the several views.

G represents the boxing or casing of the thrashing-machine, to the sides of which the round bars E E are secured, commencing at the receiving-chute H, and following down in a half-circle close to the outline of the beating device P. From the receiver H the sheaves of grain pass onto top of the beater P. This beater P is formed by securing to the shaft A with set-screws $a\ a$ the cast-iron disks B B. To these are secured in a circle around shaft A the iron rods C C C by screw-threads and nuts $c\ c$.

To the iron rods C C are pivoted the long, straight, thin fingers or beaters D D, between the thin circular guide-plates I I on each side of the beaters, to prevent them being bent. Said fingers D D are spaced so that one half of them strike between the other half. $d\ d$ are the washers on rods C C, separating the fingers D D. The circular iron plates I I at each side of the fingers D D, having the shaft A as a center, and holes cut through for said shaft A and for the iron rods C C C, strengthen the frame of the beater P and prevent the rods C C from being bent. Should one of the beaters D D break, a new one can be easily inserted after loosening the nuts $c\ c$ and taking out the rod C, to which the broken finger was pivoted. The beaters D D, being loose on shafts C C, will not tear and break the straw, as the stationary fingers on the common thrashing-cylinders invariably do. When the sheaves of grain pass from the receiver H onto top of the beater P they are thrown and beaten by the fingers D D onto the bars E E, which allow the grain, as it is beaten and separated from the straw, to drop clear of it onto the solid smooth concave bottom F, formed of sheet-iron or other like material, while the straw passes toward the rear of the machine by devices prepared for conveying the same. Thus by means of the grated concave which is formed by the bars E E, in the moment the beating commences, the separating of the grain from the straw is effected.

What I claim, and desire to secure by Letters Patent, is—

In a thrashing-machine, the combination of the casing G, the receiver H, the solid concave bottom F, the grated concave formed by the round iron rods E E, the shaft A, the cast-iron disks B B, the iron rods C C, the beaters D D, the thin circular guide-plates I I, and the washers $d\ d$, all substantially as described, and for the purpose specified.

In testimony whereof I have signed my name to this specification in the presence of two subscribing witnesses.

JAMES BUCHANAN.

Witnesses:
CHAS. MAAS,
G. KOEHLER.